(12) United States Patent
Jo et al.

(10) Patent No.: US 9,425,590 B2
(45) Date of Patent: Aug. 23, 2016

(54) WITHDRAWABLE-TYPE CIRCUIT BREAKER

(71) Applicant: LSIS CO., LTD., Anyang-si, Gyeonggi-do (KR)

(72) Inventors: Jun Youn Jo, Daejeon (KR); Hong Ik Yang, Cheongju-si (KR); Kil Young Ahn, Daejeon (KR); Seung Pil Yang, Cheongju-si (KR); Seung Hwan Mun, Gwangmyeong-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/521,097

(22) Filed: Oct. 22, 2014

(65) Prior Publication Data

US 2015/0171605 A1   Jun. 18, 2015

(30) Foreign Application Priority Data

Dec. 16, 2013  (KR) ......................... 10-2013-0156698
Jan. 28, 2014  (KR) ......................... 10-2014-0010790

(51) Int. Cl.
*H02B 11/133*   (2006.01)
*H01H 9/20*     (2006.01)

(52) U.S. Cl.
CPC ............... *H02B 11/133* (2013.01); *H01H 9/20* (2013.01)

(58) Field of Classification Search
None
See application file for complete search history.

(56) References Cited

U.S. PATENT DOCUMENTS

| | | | | |
|---|---|---|---|---|
| 5,206,468 | A * | 4/1993 | Kobayashi | ........... H02B 11/133 200/50.23 |
| 8,575,502 | B2 * | 11/2013 | Yang | ................... H02B 11/133 200/50.21 |
| 8,796,570 | B2 * | 8/2014 | Kobayashi | ........... H02B 11/133 200/50.22 |
| 2010/0230256 | A1 * | 9/2010 | Lee | ..................... H02B 11/133 200/50.21 |
| 2011/0080238 | A1 * | 4/2011 | Kim | ........................ H01H 3/16 335/128 |
| 2011/0147172 | A1 * | 6/2011 | Kim | ..................... H02B 11/133 200/50.21 |
| 2012/0217223 | A1 | 8/2012 | Kim | |

(Continued)

FOREIGN PATENT DOCUMENTS

| | | |
|---|---|---|
| CN | 201466550 U | 5/2010 |
| CN | 202178173 U | 3/2012 |
| CN | 102611024 A | 7/2012 |

(Continued)

OTHER PUBLICATIONS

European Patent Office Application Serial No. 14190045.6, Search Report dated May 4, 2015, 9 pages.

(Continued)

*Primary Examiner* — Courtney Smith
(74) *Attorney, Agent, or Firm* — Lee, Hong, Degerman, Kang & Waimey; Jonathan Kang; Richard Salfelder

(57) ABSTRACT

Disclosed is a withdrawable-type circuit breaker, including a cradle, a main body disposed to be inserted into and withdrawn from the cradle by a transfer device, and an interlock device for restricting a withdrawal of the main body when the circuit breaker is in a connected state, wherein the interlock device includes a support part vertically disposed on a bottom surface of the main body, an interlock lever, having a sliding hole at one end thereof and a power transmission part at another end thereof, hinge-coupled at its medium portion to one end of the support part, and an interlock pin having one end inserted into and coupled to the sliding hole and another end up and downwardly movable and insertable to an interlock pin hole formed in a bottom surface of the cradle.

12 Claims, 23 Drawing Sheets

(56) References Cited

U.S. PATENT DOCUMENTS

2012/0261239 A1* 10/2012 Kim .................. H02B 11/24
 200/304
2014/0027408 A1* 1/2014 Yang .................. H01H 33/66
 218/118

FOREIGN PATENT DOCUMENTS

| | | |
|---|---|---|
| EP | 0048042 | 3/1982 |
| JP | 51-141367 | 12/1976 |
| JP | 53-159532 | 12/1978 |
| JP | 08-022750 | 1/1996 |
| JP | 09-084226 | 3/1997 |
| JP | 10-210611 | 8/1998 |
| JP | 11-164422 | 6/1999 |
| KR | 20-1998-0056142 | 10/1998 |
| KR | 10-2010-0102490 | 9/2009 |
| KR | 10-2011-0085234 | 7/2011 |

OTHER PUBLICATIONS

Korean Intellectual Property Office Application Serial No. 10-2013-0156698, Notice of Allowance dated Jan. 29, 2015, 2 pages.
State Intellectual Property Office of the People's Republic of China Application Serial No. 201410782520.2, Office Action dated Jun. 3, 2016, 5 pages.

* cited by examiner

WITHDRAWABLE-TYPE CIRCUIT BREAKER

CROSS-REFERENCE TO RELATED APPLICATION

Pursuant to 35 U.S.C. §119(a), this application claims the benefit of earlier filing date and right of priority to Korean Application Nos. 10-2013-0156698 and 10-2014-0010790 filed on Dec. 16, 2013 and Jan. 28, 2014, respectively, the contents of which are incorporated by reference herein in their entireties.

BACKGROUND OF THE INVENTION

1. Field of the Invention

The present invention relates to a circuit breaker, more particularly, to a withdrawable-type circuit breaker which has an enhanced safety in a withdrawing operation.

2. Description of the Conventional Art

In general, a circuit breaker is a device configured to pre-detect an abnormal current which may occur in an electric circuit, and to forcibly cutoff an electric path between a power supply side and a load side.

Such a circuit breaker is classified into a fixed-type breaker which is fixedly disposed within a panel of a distribution board and a withdrawable-type breaker which has a main body disposed in an outer box, called a cradle, in an insertable and withdrawable manner so that maintenance and handling may be simply and easily performed.

FIG. 1 is a schematic view illustrating a state that a main body of a circuit breaker is located in a connected position (operation position), and FIG. 2 is a schematic view illustrating a state that a main body of a circuit breaker is located in a test position.

Referring to FIGS. 1 and 2, a cradle 14 includes outer box terminal parts 12 for connecting an electric path of a power supply side to an electric path of a load side of an external power system circuit, and a circuit breaker main body 10 (hereinafter, referred to as "a main body") includes main body terminal parts 15 at one side of a circuit breaker main body frame 11 (hereinafter, referred to as "a main body frame") and is connectable to the outer box terminal parts 12.

The main body 10 may be configured to be located at one of a connected position (or a service position, refer to FIG. 1) to connect an electric path of a power supply side of an external power system circuit and an electric path of a load side by being transferred and connected to the outer box terminal parts 12 of the cradle 14 by a separate transfer device 13; a test position (refer to FIG. 2) for testing a connected operation and a disconnected operation of the main body 10, under a separated state from the terminal parts 12 so that a connection to the main circuit is cutoff, but under a connected state to a control power line; and a disconnected position in which a connection to the control power line and the outer power system circuit is cutoff.

FIG. 3 is a partial enlarged view illustrating a conventional circuit breaker in which a connection spring is discharged within a main body, and FIG. 4 is a partial enlarged view illustrating a conventional circuit breaker in which a connection spring is charged within a main body.

As shown in FIGS. 3 and 4, the circuit breaker 10 includes a connection spring 2 which is configured to execute a connection operation of the circuit breaker.

Referring to FIGS. 3 and 4, a connection operation of the circuit breaker will be described.

As shown in FIG. 3, a user rotates a cam assembly 5 in a clockwise direction using a manual charging handle or a charging motor, so that a crank assembly 4 can be rotated in a clockwise direction by a connection structure (a cam-follower structure) of the cam assembly 5 and a drive crank assembly 4.

Referring to FIG. 4, the cam assembly 5 is rotated until it is stopped by a closing latch 6, and the connection spring 2 accumulates an elastic force for a connection operation of the circuit breaker by being compressed by the drive crank assembly 4.

The closing latch 6 is configured to restrict an amount of rotation of the cam assembly 5 when the connection spring 2 is charged (the term "charge" in the description means that the connection spring 2 is compressed to accumulate an elastic force therein for a connection operation of the circuit breaker).

The circuit breaker is configured to execute a connection operation using an elastic force accumulated in and then released from the connection spring 2.

In such a withdrawable-type circuit breaker, the main body 10 can be completely withdrawn to outside of the cradle irrespective of a charging, a connection, or a breaking state of the circuit breaker.

Meanwhile, when a connection button is pressed by a user's erroneous operation in a case where the main body is withdrawn to outside of the cradle in a compressed state of the connection spring, a connection operation is executed while the elastic force accumulated in the connection spring 2 is discharged.

Due to such an operation, a user may be astonished by noise generated by the connection operation or a secondary safety accident may occur.

FIGS. 5 and 6 illustrate open and connected states of the conventional circuit breaker.

The circuit breaker mainly includes a mechanical part 21, a frame 22, a main circuit movable part 23, a main circuit fixing part 24, and a mechanical part driving shaft 27, a mechanical part driving link 25 and a main circuit driving link 26 which are configured to connect the mechanical part 21 and the main circuit movable part 23 to each other.

In a state that the circuit breaker is open, the connection spring 2 is charged by a manual or electrical operation, and the mechanical part 21 is driven by the charged connection spring 2. The mechanical part driving unit 27 is configured to connect the mechanical part 21 and the main circuit movable part 23 to each other, the main circuit movable part 23 and the main circuit fixing part 24 are connected to each other when the circuit breaker is in a connected state.

Under such a configuration, a connected state of the circuit breaker is maintained, and an electric conduction may be possible. Further, when a fault current or a disconnection occurs, the circuit breaker performs a trip operation by an electrical signal and the mechanical part 21 to thus prevent any possible accident.

Referring to FIG. 6, in a connected state of the circuit breaker, since the compression spring 28 is compressed, a downward trip load is generated. The trip load is maintained without being discharged, unless a fault current is generated at the circuit breaker or the mechanical part is intentionally operated.

FIGS. 7 and 8 illustrate a discharged state and a charged state of an open spring of the mechanical part 21 of the circuit breaker.

As shown in FIGS. 7 and 8, a compression spring 28 of the main circuit part and the open spring 33 of the mechanical part are maintained in a charged state under a connected state of the circuit breaker.

When a user performs an open operation by manually or an electromotive force, the mechanical part driving shaft 27 is rotated in a counterclockwise direction and thus the open spring 33 is operated in a discharged state.

Meanwhile, it should be noted that the main body must not be inserted into or withdrawn from the cradle when the circuit breaker is in a connected state. In a case where the main body is withdrawn to outside in a connected state, if an open button is pressed by a user's mistake in a state that the main body has been withdrawn or is being withdrawn, an accident may occur to the user while energy, i.e., an elastic force accumulated in the open spring 33 of the mechanical part 21 and the compression spring 28 of the main circuit part, is discharged out.

SUMMARY OF THE INVENTION

An object of the present invention is to provide a withdrawable-type circuit breaker, which is capable of preventing a main body from being withdrawn to outside of a cradle when a connection spring is compressed.

Another object of the present invention is to provide a withdrawable-type circuit breaker, which is capable of preventing generation of an insertion and/or a withdrawal operation in a connected state of the circuit breaker.

To achieve these and other advantages and in accordance with the purpose of this specification, as embodied and broadly described herein, there is provided a withdrawable-type circuit breaker, including a cradle; a main body configured to be inserted into a cradle by a transferring device to connect a main circuit or to disconnect a connected state of the main circuit by being withdrawn from the cradle; and an interlock device configured to restrict a withdrawal of the main body when the circuit breaker is in a connected state.

The interlock device may be configured to include a support part vertically disposed on a bottom surface of the main body; an interlock lever having a sliding hole at one end thereof and a power transmission part at another end thereof, the interlock lever configured such that its middle portion is hinge-coupled to one end of the support part so that its two ends can be rotated; and an interlock pin having one end slidably coupled to the sliding hole and another end configured to be movable upward and downward into the interlock pin hole formed on a bottom surface of the cradle.

In an embodiment, the main body may be configured to include a main body frame; a connection spring disposed within the main body frame, and configured to perform a connection operation of the circuit breaker using an elastic force generated when released; and a drive crank assembly disposed within the main body frame, connected to the connection spring through a connection rod and a spring support part provided at one end of the connection rod, transfer a rotational force to the connection spring through the connection rod and the spring support part to compress or release the connection spring, transfer a rotational force to the power transmission part by being in contact therewith through the one end, and rotate the interlock lever.

In an embodiment, the circuit breaker may further include an elastic member, disposed between the interlock lever and the support part, configured to connect a power transmission part of the interlock lever to the drive crank assembly by an elastic force.

In an embodiment, the interlock pin may be configured to restrict movement of the main body by being inserted into the interlock pin hole when the connection spring is compressed.

In an embodiment, the elastic member may be a coil spring configured to elastically support the power transmission part to be in contact with one end of the drive crank assembly, as its on end is coupled to one end of the interlock lever and its another end is coupled to the support part.

In another embodiment, the elastic member may be a twisted spring configured to elastically support the power transmission part to be in contact with one end of the drive crank assembly, as its one end is coupled to one end of the support part and its another end is coupled to an intermediate portion of the interlock lever.

In an embodiment, the transfer device may include a through-hole through which the interlock pin passes and a transfer truck for supporting the main body.

In an embodiment, the support part may include a pair of support plates which are spaced apart from each other, having one end connected to an intermediate portion of the interlock lever by a hinge shaft and another end coupled to a bottom surface of the main body; and a connection member installed between the support plates, and configured to connect the pair of support plates to each other.

In an embodiment, the support part may include a stopper disposed between the support plates within a rotation radius and restrict a rotation angle of the interlock lever.

In an embodiment, the interlock lever may have a rod shape, and the sliding hole may be a slit formed at another end of the interlock lever in a lengthwise direction with a preset length.

In another embodiment, the interlock pin hole may include a first interlock pin hole in which the interlock pin is inserted in a case where the main body is inserted in a connection position, and a second interlock pin hole in which the interlock pin is inserted in a case where the main body is withdrawn to a test position.

In another embodiment, the interlock lever may be provided with a coupling hole formed at the power transmission part, connected to the mechanical part driving link provided in the main body by a shaft through the coupling hole, and configured to insert the interlock pin into the interlock pin hole as power is transmitted through the power transmission part of the interlock lever as the mechanical driving link is moved upwardly when the circuit breaker is in a connection position.

In another embodiment, the coupling hole may be formed as a slit such that the shaft of the mechanical part driving link is slidably coupled thereto.

As described above, in the withdrawable-type circuit breaker according to the present invention, the main body may be withdrawn in a case where the connection spring is released from its compression state so that a safety can be ensured when the main body is withdrawn.

Further, there is an effect to prevent generation of an insertion and/or withdrawal of the main body when the circuit breaker is in a connected state.

Further, as the interlock operation is executed in cooperation with the mechanical part driving link, an immediate and safe operation of the circuit breaker can be obtained and an economical effect can be implemented by the simple structure of the system.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE PREFERRED EMBODIMENT

Hereinafter, a preferred embodiment of a withdrawable-type circuit breaker according to an embodiment of the present invention will now be described in detail with reference to the accompanying drawings.

An Example

The present invention relates to a withdrawable-type circuit breaker which is capable of preventing a circuit breaker main body from being inserted into and/or withdrawn from in a compressed state of a connection spring 122.

Figure 1:
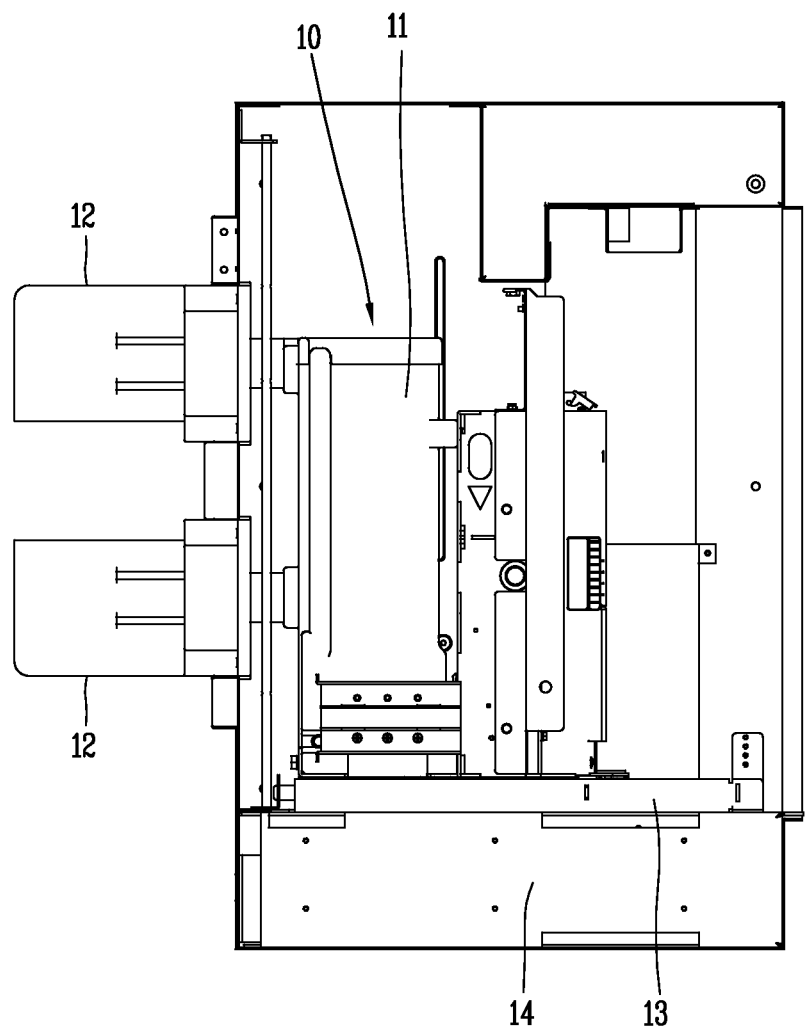
FIG. 1 is a schematic view illustrating a state that a circuit breaker main body is in a connection position.
Figure 2:
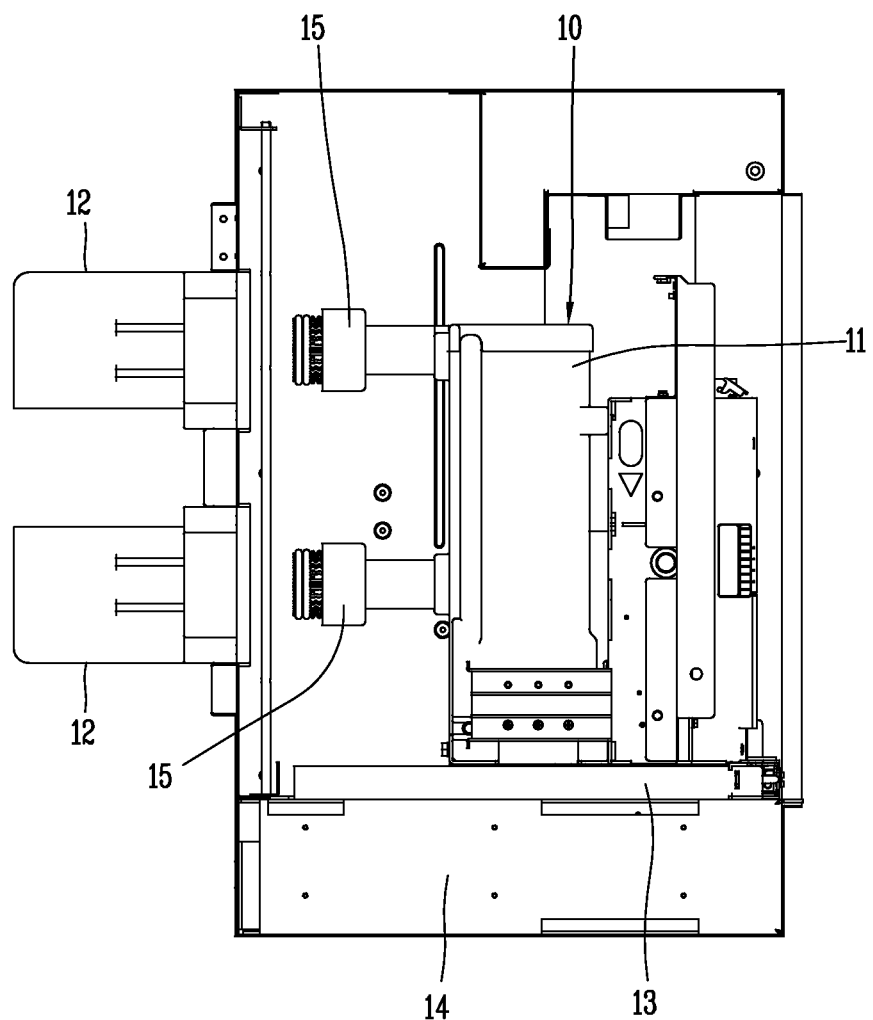
FIG. 2 is a schematic view illustrating a state that a circuit breaker main body is in a test position.
Figure 3:
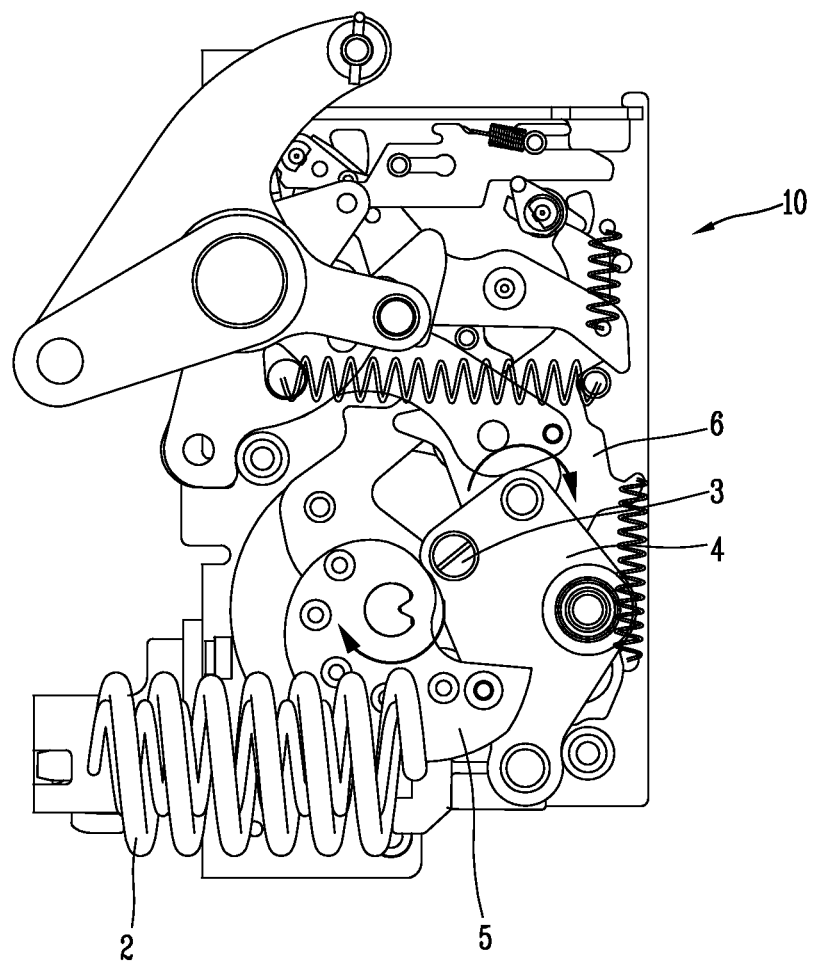
FIG. 3 is a partially-enlarged view illustrating a state that a connection spring is discharged within the circuit breaker main body in accordance with the conventional art.
Figure 4:
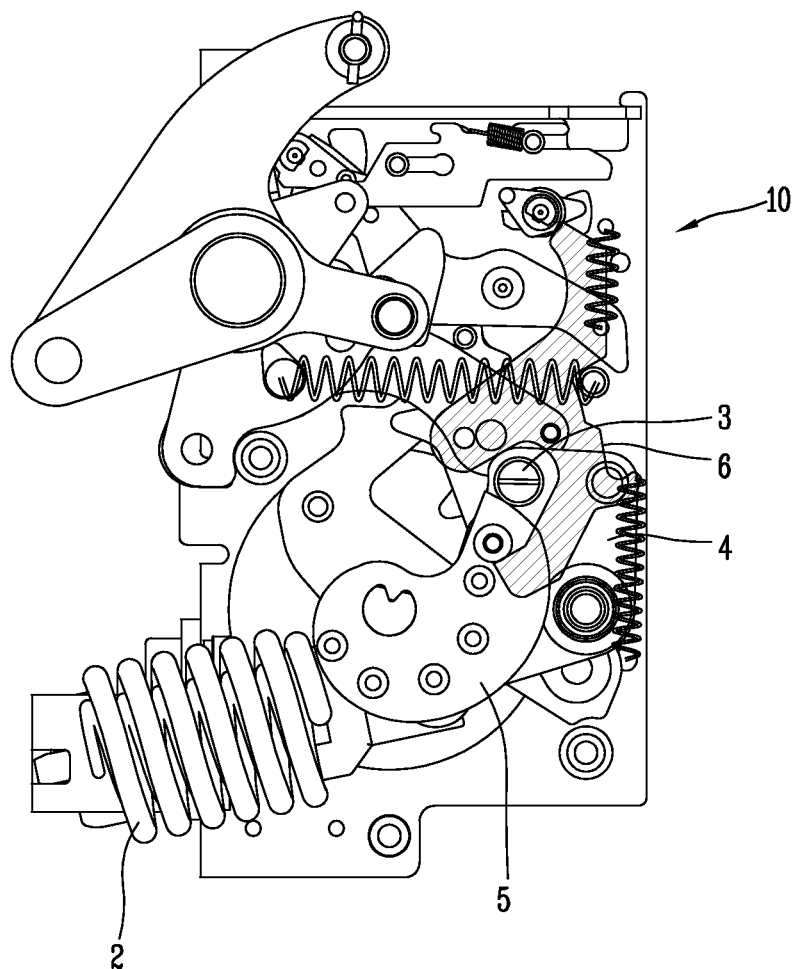
FIG. 4 is a partially-enlarged view illustrating a state that the connection spring is compressed within the circuit breaker main body in accordance with the conventional art.
Figure 5:
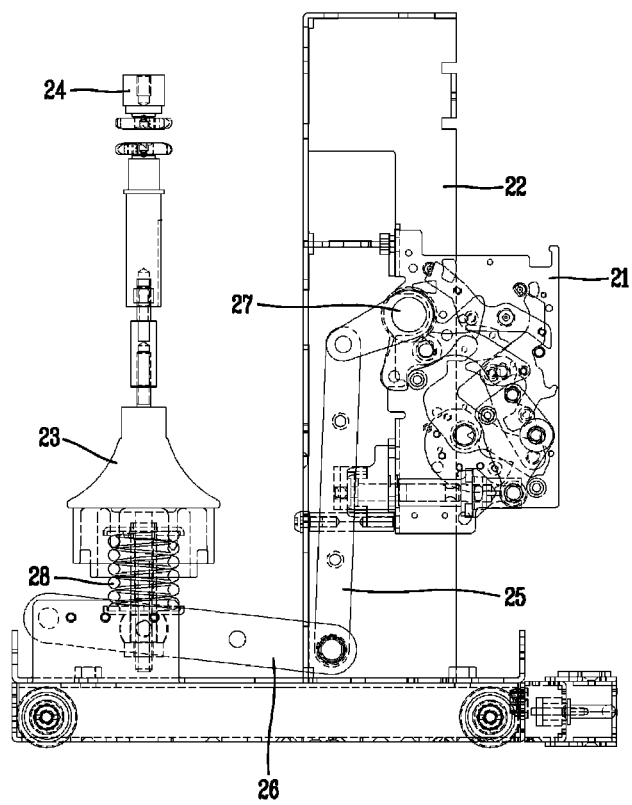
FIG. 5 is a view illustrating that the circuit breaker is in an open state in accordance with the conventional art.
Figure 6:
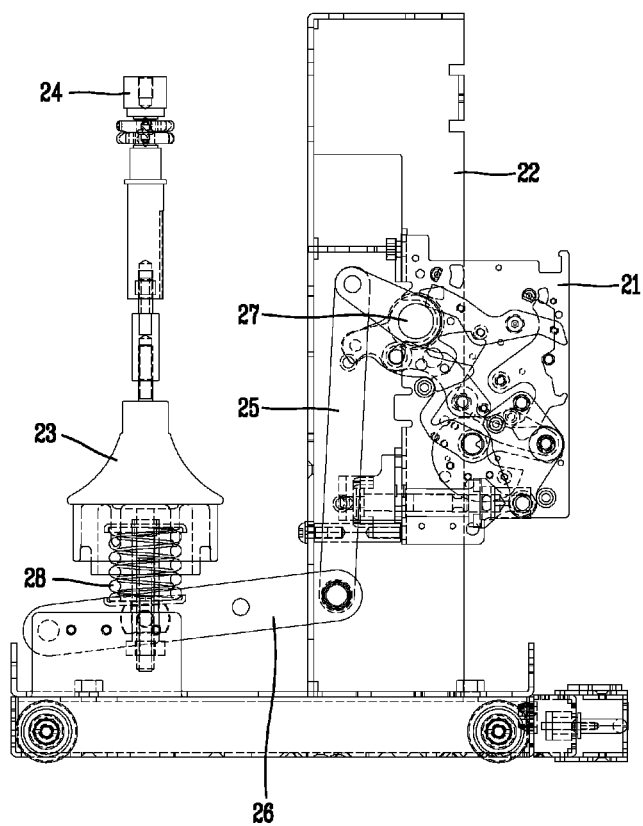
FIG. 6 is a view illustrating that the circuit breaker is in a connected state in accordance with the conventional art.
Figure 7:
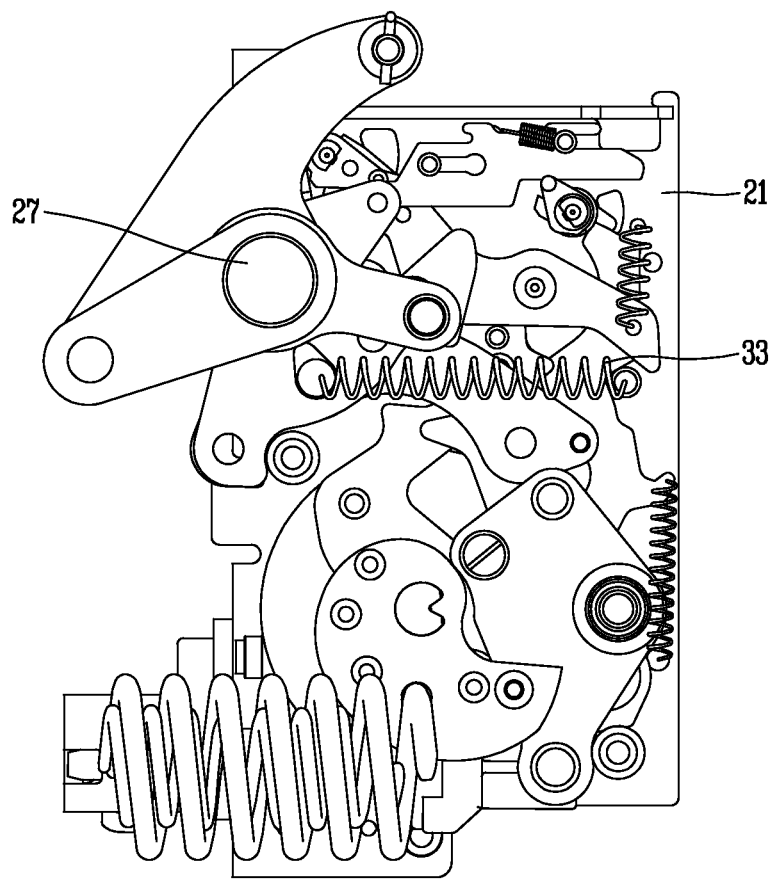
FIG. 7 is a detailed view illustrating a mechanical part of FIG. 5.
Figure 8:
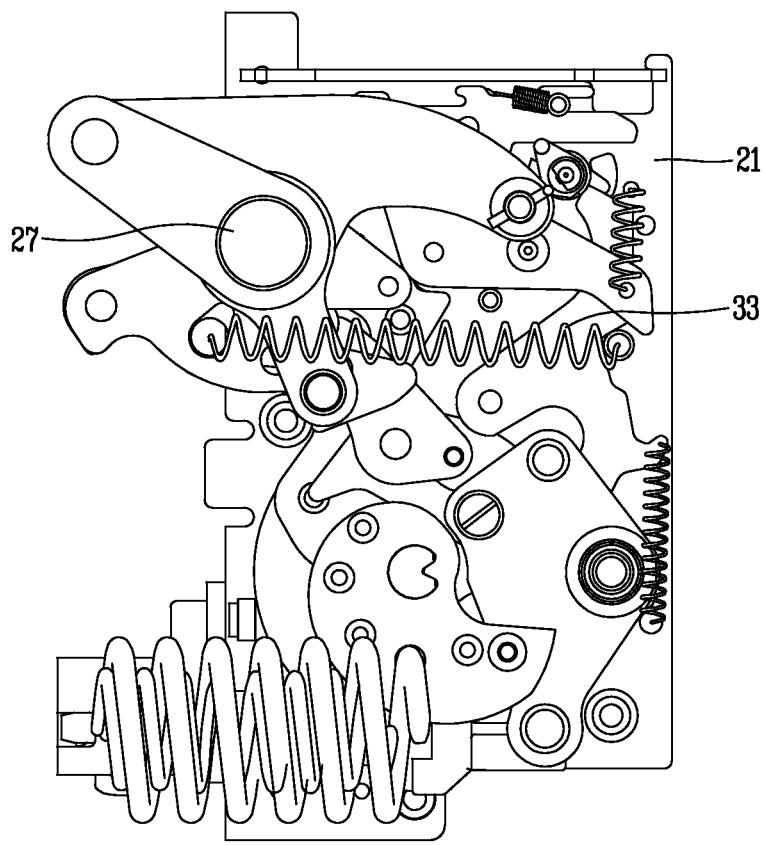
FIG. 8 is a detailed view illustrating a mechanical part of FIG. 6.
Figure 9:
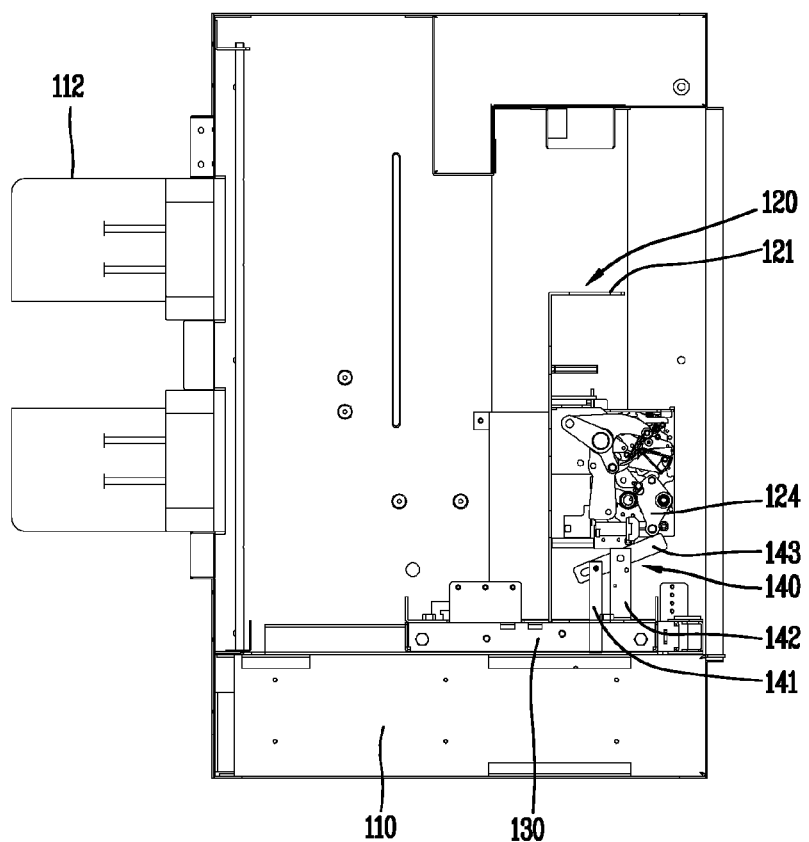
FIG. 9 is a side view illustrating a withdrawable-type circuit breaker in accordance with an embodiment of the present invention.
Figure 10:
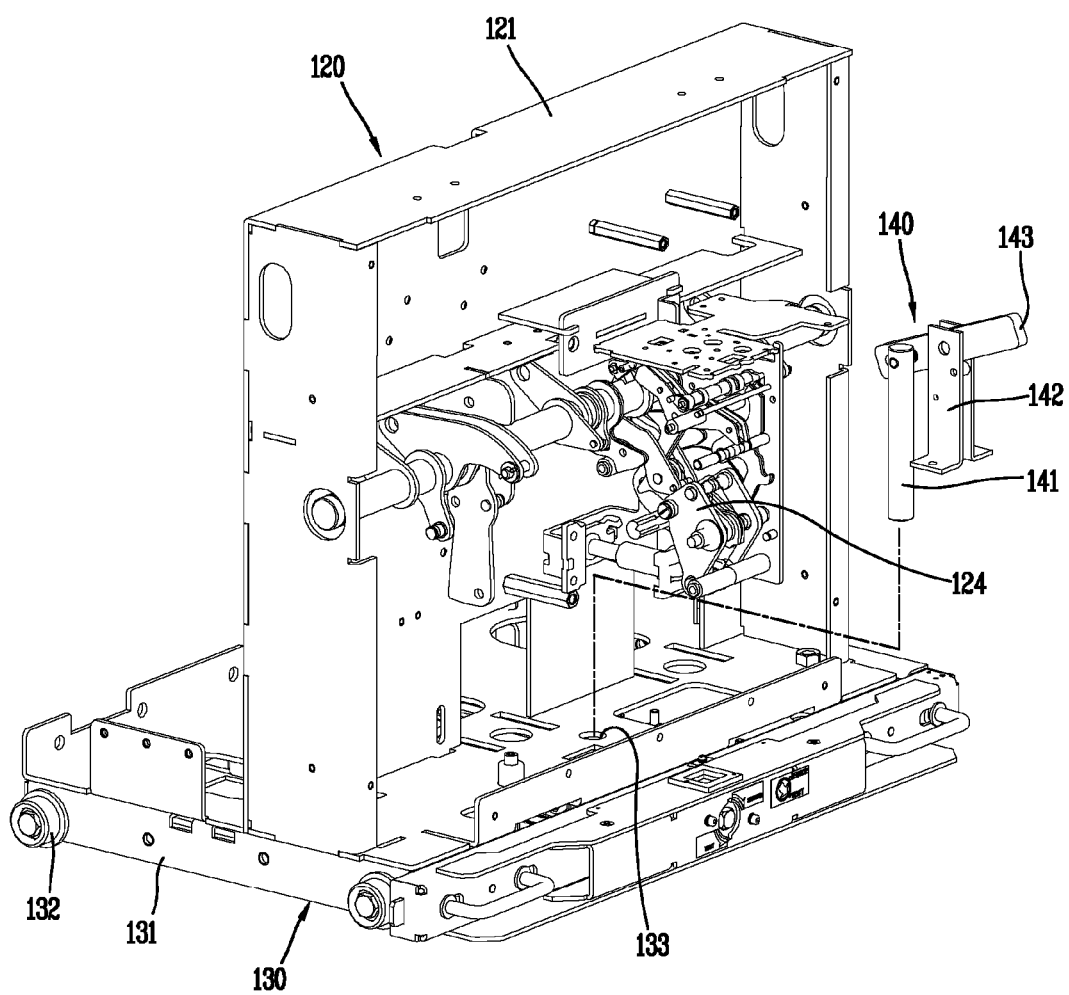
FIG. 10 is a disassembled view illustrating a state where an interlock device has not been installed within a circuit breaker main body of FIG. 9.

FIG. 9 is a side view illustrating the withdrawable-type circuit breaker according to an embodiment of the present invention; and FIG. 10 is a disassembled view illustrating a state where an interlock device 140 has not been installed within the circuit breaker main body 120 of FIG. 9.

As shown in FIGS. 9 and 10, a circuit breaker according to an embodiment of the present invention mainly includes a cradle 110, a circuit breaker main body 120, and a transfer device 130.

The cradle 110 constitutes an outer box which is installed within a panel of a distribution board.

An outer box terminal part 112, to which an external power supply and a load are connected, respectively, is provided to protrude outwardly from an inner rear side of the cradle 110.

The main body 120 includes a main body frame 121, an open/close mechanical part disposed within the main body frame 121, a control circuit part for controlling the open/close mechanical part, and a main body terminal part formed to extend in a horizontal direction from a rear side of the main body frame 121.

The main body frame 121 is formed to have a rectangular box shape and constitutes an external shape of the circuit breaker. The main body frame 121 is vertically disposed to be supported at an upper portion of the transfer device 130, and may be inserted into and withdrawn from the cradle 110 by the transfer device 130.

The open/close mechanical part includes a connection spring 122 configured to execute a connection operation, a drive crank assembly 124 configured to compress (charge) and/or discharge the connection spring 122, a cam assembly configured to rotate the drive crank assembly 124, and the open/close mechanical part is configured to execute a connection and a breaking operation of the circuit breaker upon receipt of a control signal from the control circuit part.

Since the open/close mechanical part has the same structure as the conventional one, a detailed description thereof will be omitted.

The drive crank assembly 124 includes a cam follower 123 which contacts an edge surface of an eccentric cam so that the cam follower 123 is interlocked with the eccentric cam when the eccentric cam is rotated, thereby being rotated in the same direction as the cam assembly.

The drive crank assembly 124 includes, at its one side, a spring connection part which is connected through a medium (i.e., a connection rod) to a spring support part 125 which is configured to support the connection spring 122. When the drive crank assembly 124 is rotated, a compression force is transmitted to the spring support part 125 according to a rotational angle of the spring support part 125 to compress the connection spring 122, or to release the connection spring 122 when a compression force is released.

The transfer device 130 includes a transfer truck 131 which is horizontally disposed and supports a lower end portion of the main body 120, and wheels 132 rotatably provided at a lower side of the transfer truck 131, and is configured to move the main body 120 in a horizontal direction.

For instance, in a case where the main body 120 is inserted into inside of the cradle 110 by the transfer device 130, the main body terminal part of the main body 120 is connected to the outer box terminal part 112 of the cradle 110 so that a connection position where the electric paths of the power side and the load side are connected to each other may be maintained. On the contrary, in a case where the main body 120 is withdrawn from inside of the cradle 110 by the transfer device 130, the main body terminal part of the main body 120 is separated from the outer box terminal part 112 of the cradle 110 so that a connected state between the electric paths of the power side and the load side is cutoff. However, the circuit breaker may be maintained in a test position to test a connection and/or breaking operation or in a disconnected position where a control power is also cutoff.

Figure 11:
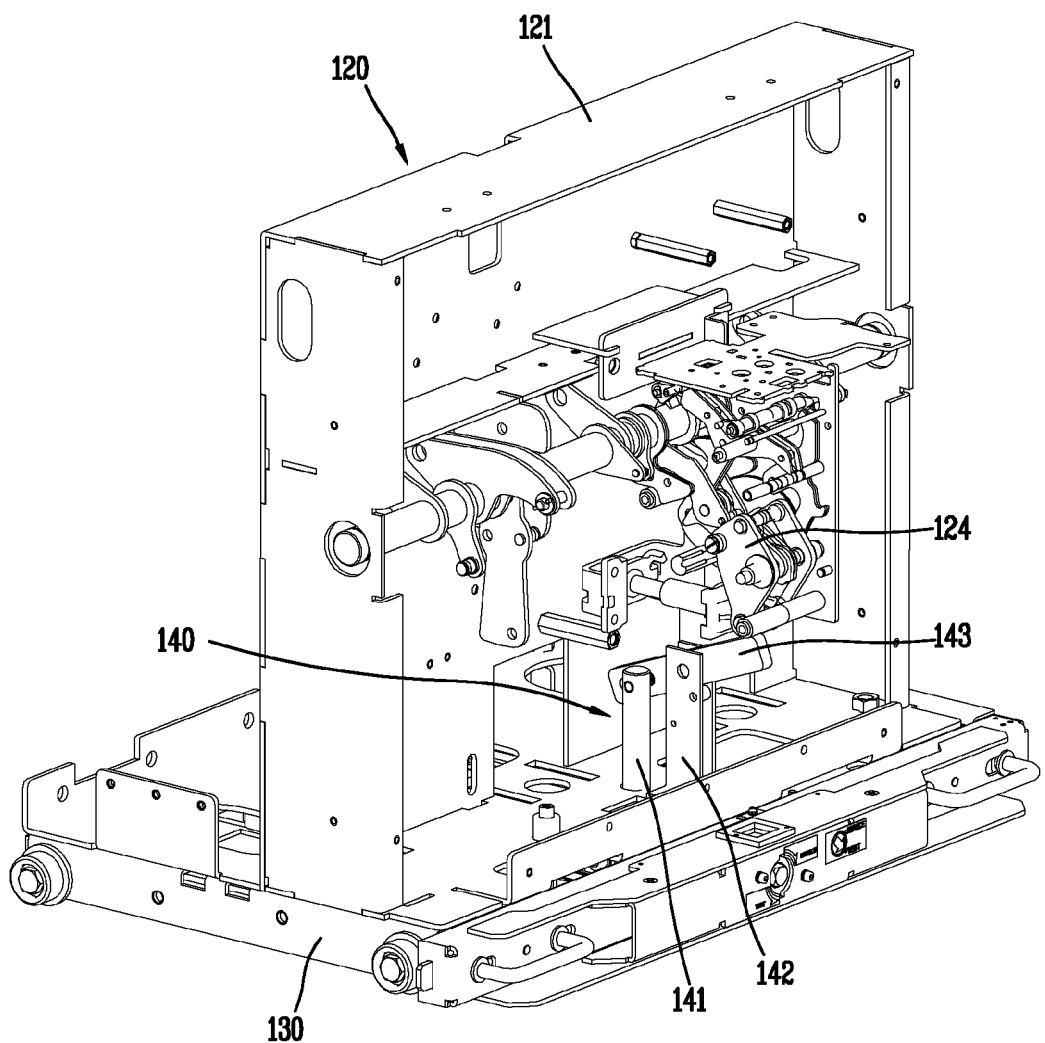
FIG. 11 is an assembled view illustrating a state where an interlock device has been installed within the circuit breaker main body of FIG. 9.
Figure 12:
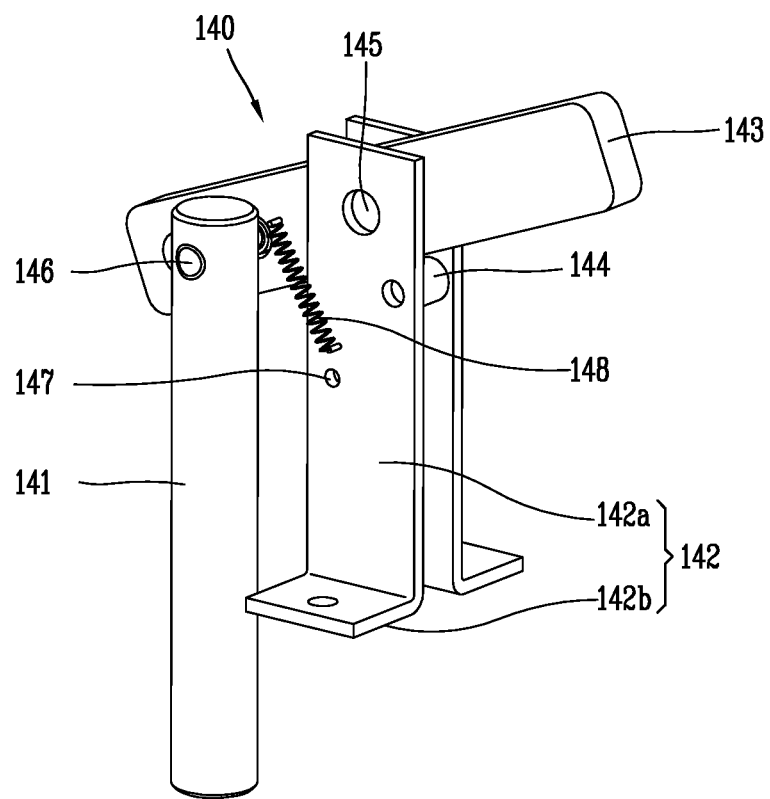
FIG. 12 is a perspective view illustrating the interlock device of FIG. 10.
Figure 13:
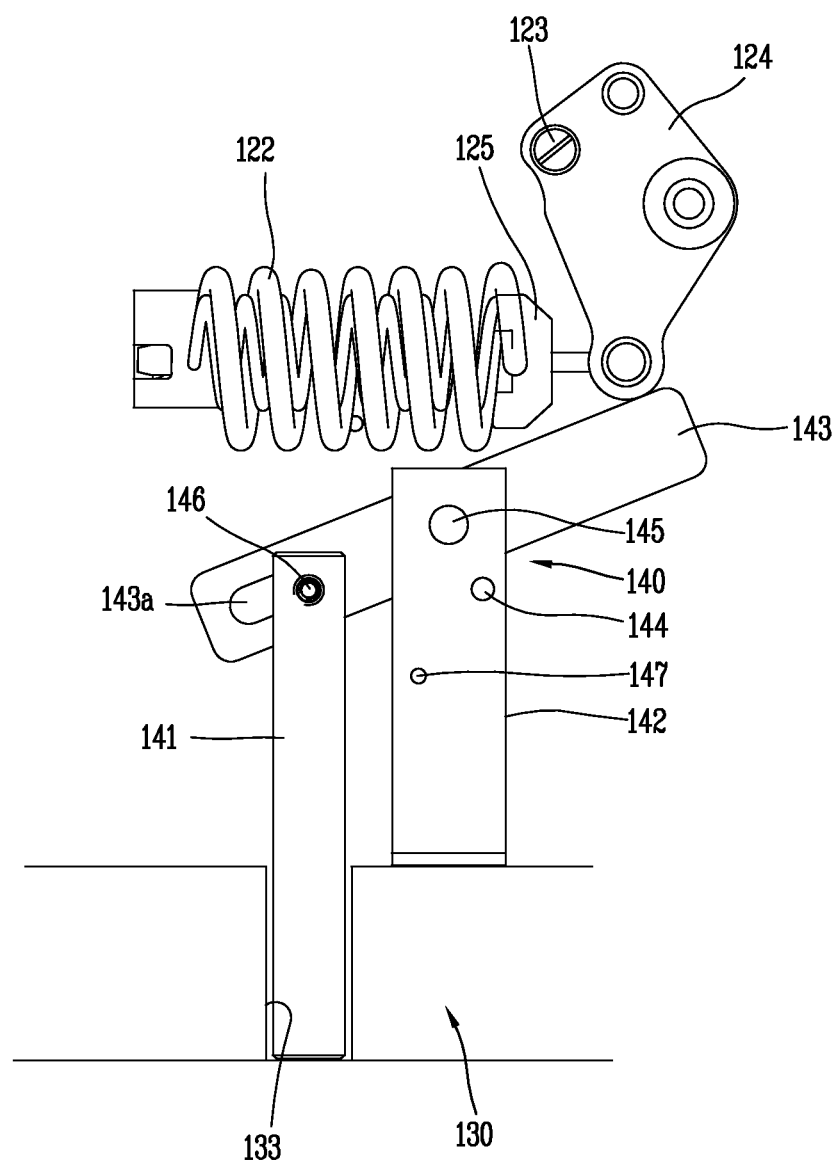
FIG. 13 is a view illustrating an operation state of the interlock device according to a position of a drive crank assembly when the connection spring is compressed.
Figure 14:
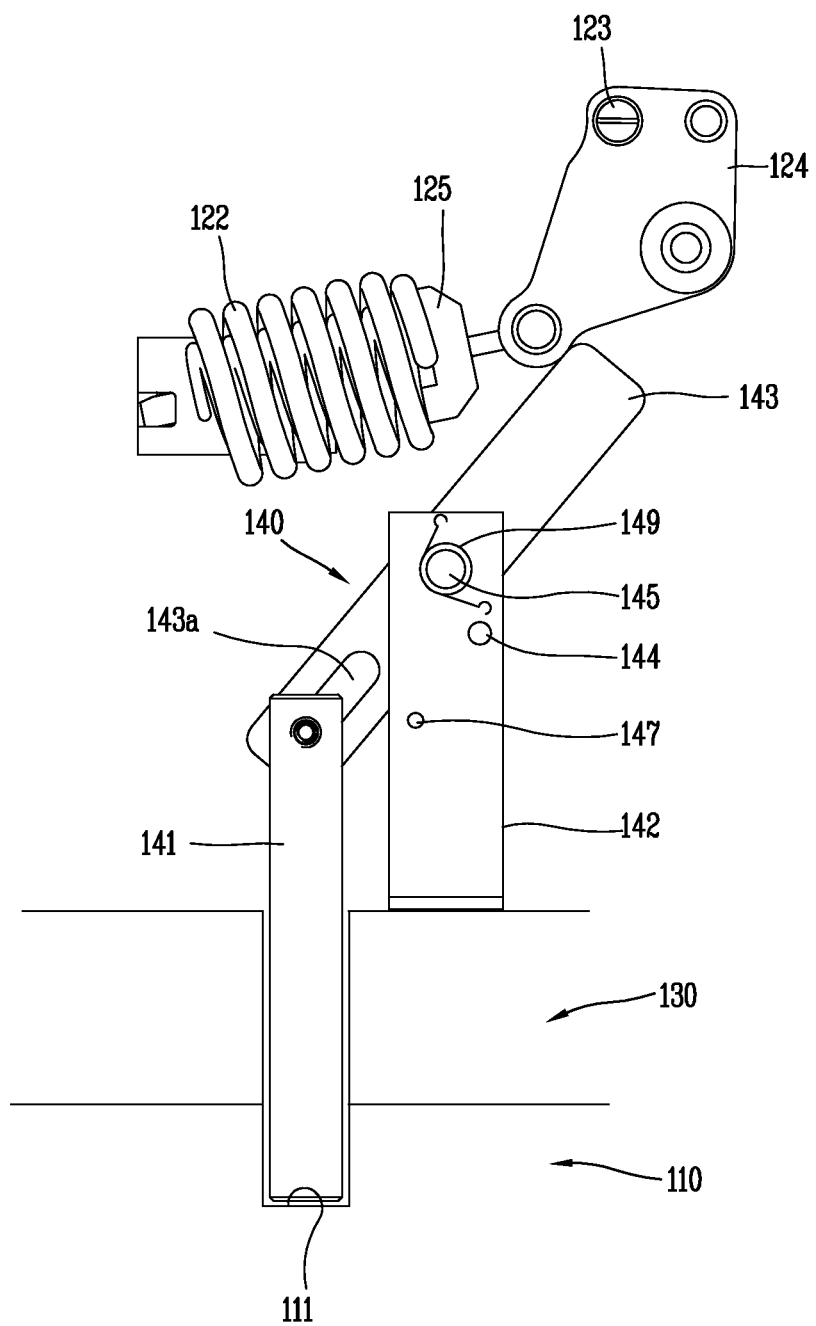
FIG. 14 is a view illustrating an operation state of the interlock device according to a position of the drive crank assembly when the connection spring is discharged.

FIG. 11 is an assembled view illustrating a state where an interlock device has been installed within the circuit breaker main body of FIG. 9; FIG. 12 is a perspective view illustrating the interlock device of FIG. 10; FIG. 13 is a view illustrating an operation state of the interlock device according to a position of the drive crank assembly when the connection spring is compressed; and FIG. 14 is a view illustrating an operation state of the interlock device according to a position of the drive crank assembly when the connection spring is discharged.

As shown in the drawings, the present invention provides an interlock device 140 to prevent a main body 120 from being withdrawn to outside of a cradle 110 in a state that the connection spring 122 has been compressed by the drive crank assembly 124.

The interlock device 140 includes an interlock pin hole 111 formed on a bottom surface of the cradle 110, and an interlock pin 141 which is configured to be inserted into and supported by the interlock pin hole 111.

The interlock pin hole 111 is vertically formed in a concaved shape on a bottom surface of the cradle 110 which faces the transfer truck 131, within a range of horizontal movement of the transfer truck 131.

The interlock pin 141 may be formed as a rod having a circular cross section, and inserted into the interlock pin hole 111 by moving in a direction perpendicular to a moving direction of the main body 120.

Further, the transfer device 130 includes a through-hole 133 long-formed in a vertical direction at its one side, the through-hole 133 through which the interlock pin 141 is inserted into the transfer device 130.

For instance, in a case where the interlock pin 141 is moved in a right downward direction within the through-hole 133 of the transfer device 130 to thus be inserted into the interlock pin hole 111, the main body 120 is restricted to the cradle 110 by the interlock pin 141. And in a case where the interlock pin 141 is moved in a right upward direction within the interlock pin hole 111 to thus be separated from the range of the interlock pin hole 111, the main body 120 may be freely moved within the cradle 110 in a horizontal direction.

That is, when the interlock pin 141 is inserted into the interlock pin hole 111, the main body 120 is fixed to the cradle 110 so that the main body 120 can not be withdrawn to outside of the cradle 110. On the contrary, when the interlock pin 141 is separated from the interlock pin hole 111, a restriction force between the main body 120 and the cradle 110 disappear so that the main body 120 can be inserted into or withdrawn from the cradle 110.

A driving force to drive the interlock pin 141 is generated from the drive crank assembly 124 which is disposed at the main body 120. As aforementioned, the drive crank assembly 124 is moved by a driving force generated from the cam assembly, a charging motor, or a manual charging handle.

As the interlock pin 141 performs a linear motion up and down and the drive crank assembly 124 performs a rotary motion, a separate motion direction converting means is required to convert the rotary motion into the linear motion.

The motion direction converting means may include an interlock lever 143, a support part 142, an elastic member 145 and the like.

The interlock lever 143 is structured as a rectangular-shaped rod, and is configured to connect the drive crank assembly 124 and the interlock pin 141 to each other. One end of the interlock lever 143 contacts one end of the drive crank assembly 124 and another end of the interlock lever 143 is coupled to one end of the interlock pin 141 by a coupling pin 146.

Further, the interlock lever 143 is coupled to an upper end of the support part 142 by a hinge, and serves as a lever.

The support part 142 may include a pair of support plates 142a spaced from each other in a state where an intermediate portion of the interlock lever 143 has been interposed therebetween and a connecting member 144 implemented in the form of a pipe, and configured to connect the support plates 142a to each other.

The support plates 142a are vertically disposed on an upper surface of the transfer truck 131, and a pair of fixing plates 142b are bent from lower ends of the support plates 142b in a horizontal direction, respectively. Each of the fixing plates 142b has a coupling hole through which the support part 142 is coupled to the transfer truck 131 by a coupling means such as a screw.

Further, the hinge shaft 145 is configured to hinge-couple upper end portions of the support plates 142a which are spaced from each other, to an intermediate portion of the interlock lever 143.

One end of the interlock lever 143 which has been hinge-coupled to upper end portions of the support plates 142a contacts one end of the drive crank assembly 124 by an elastic member.

The elastic member may be a coil spring 148 or a twisted spring 149.

For instance, as shown in FIG. 12, a coil spring 148 may be disposed in a diagonal direction between the support part 142 and the interlock lever 143, or one end of the coil spring 148 is fixed to the interlock lever 143 by a fixing member and another end thereof may be fixed to the support part 142 by a separate fixing member.

The coil spring 148 is configured to generate a force to rotate the interlock lever 143 in a counterclockwise direction, centering around the hinge shaft 145. Under such a configuration, another end of the interlock lever 143 is pulled toward a lower side of the support part 142 by the coil spring 148, and one end of the interlock lever 143 is rotated toward an upper side of the support part 142 so that the interlock lever 143 may be always in contact with a lower end of the drive crank assembly 124.

As shown in FIG. 14, in a case where the twisted spring 149 is disposed between the support part 142 and the interlock lever 143, one arm portion of the twisted spring 149 may be fixed to the support part 142 and another arm portion thereof may be fixed to the interlock lever 143.

The twisted spring 149 is configured to generate a force to rotate the interlock lever 143 in a counterclockwise direction, centering around the hinge shaft 145. Under such a configuration, another end of the interlock lever 143 is pulled toward a lower side of the support part 142 by the twisted spring 149, and one end of the interlock lever 143 is rotated toward an upper side of the support part 142 so that the interlock lever 143 may be always in contact with a lower end of the drive crank assembly 124.

The connection member 144 may be disposed between the support plates 142a so as to be spaced from the hinge shaft 145 of the support part 142, and a stopper 147 may be disposed between the support plates 142a so as to be spaced from the connection member 144 in a downward diagonal direction.

The stopper 147 is disposed within a rotation range of the interlock lever 143 so as to interfere therewith so that the interlock lever 143 is prevented from being out of a predetermined range of angle by being caught by the stopper 147 when downward rotating.

The interlock lever 143 includes a sliding hole 143a formed at another end thereof in a lengthwise direction to allow the interlock pin 141 to linearly move up and down when receiving power from the drive crank assembly 124 and the elastic member through the interlock lever 143.

The sliding hole 143a is configured to allow a coupling pin 146 which connects the interlock pin 141 and the interlock lever 143 to each other, to be slidably moved according to a rotation angle of the interlock lever 143. Thus, a certain gap between the interlock pin 141 and the support part 142 is maintained to permit the interlock pin 141 to linearly move up and down.

Figure 15:
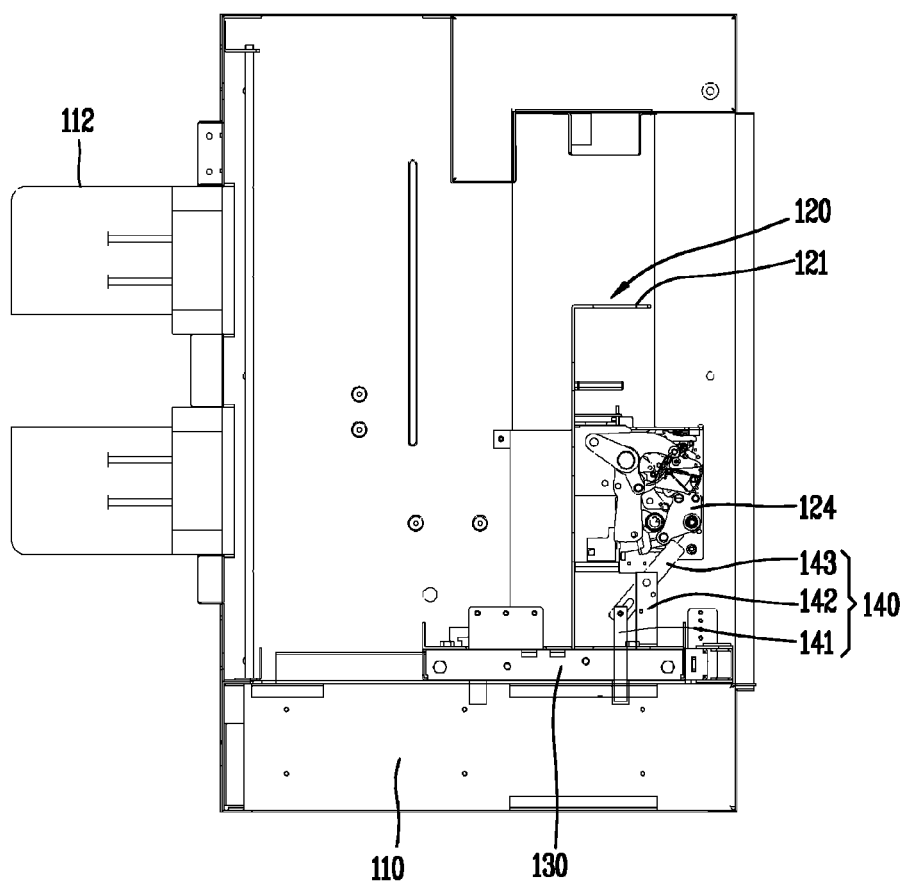
FIG. 15 is a side view illustrating a state that a circuit breaker main body is restricted to a cradle by an interlock shaft from FIG. 9.

Referring to FIG. 15, there is shown a state that the main body 120 is restricted to the cradle 110 by the interlock pin 141 of FIG. 9.

For instance, when the drive crank assembly 124 is rotated in a direction (clockwise direction) to compress the connection spring 122, another end of the interlock lever 143 is rotated from a lock releasing position, as shown in FIG. 9, to a lower direction, and the coupling pin 146 of the interlock pin 141 is slidably moved in a direction to become distant from the hinge shaft 145 of the interlock lever 143 within the sliding hole 143a, as shown in FIG. 10. As a result, the interlock pin 141 moves downward to a lock position to thus be inserted into the interlock pin hole 111, so that the main body 120 can be restricted to the cradle 110 (refer to FIG. 11).

On the contrary, when the drive crank assembly 124 is rotated in a direction (counterclockwise direction) to discharge the connection spring 122, another end of the interlock lever 143 is rotated to a lock releasing position (upward direction) shown in FIG. 13, and the coupling pin 146 of the interlock pin 141 is slidably moved in a direction to become closer to the hinge shaft 145 of the interlock lever 143 within the sliding hole 143a. As a result, the interlock pin 141 moves upward to a lock releasing position (refer to FIG. 13) to thus be separated from the interlock pin hole 111, so that the main body 120 can be freely inserted into or withdrawn from the cradle 110.

According to the above interlock device 140, the interlock pin 141 is moved up and down according to a rotation position of the drive crank assembly 124 which is configured to compress or discharge the connection spring 122. This can prevent the main body 120 from being withdrawn in a compressed state of the connection spring.

Another Embodiment

Figure 16:
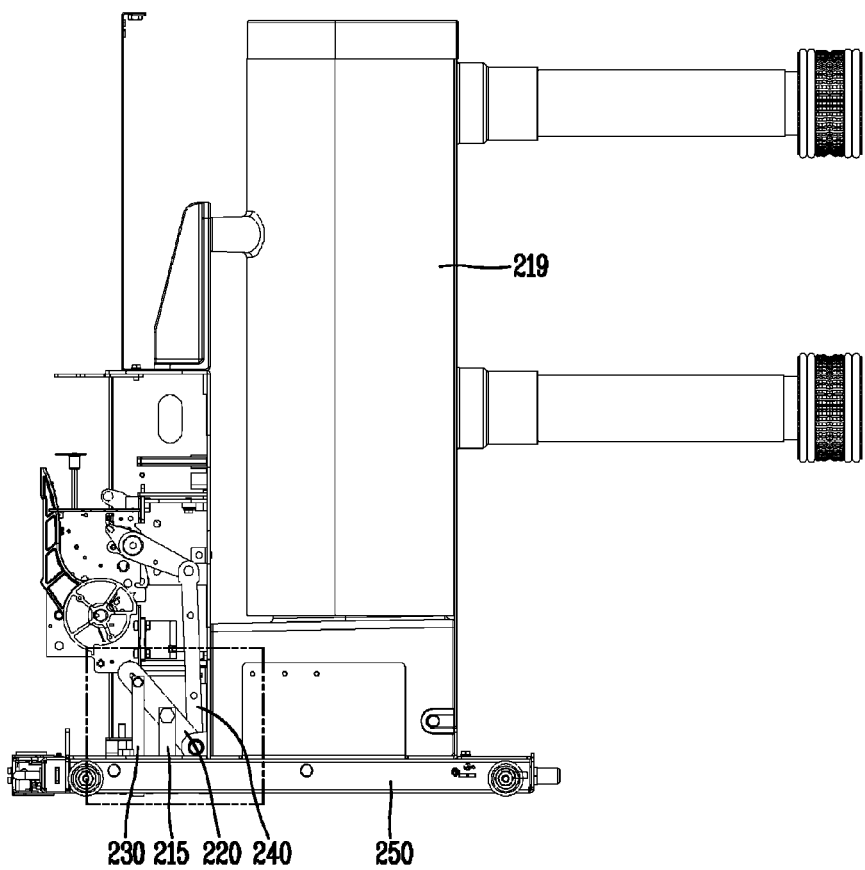
FIG. 16 is a view illustrating a circuit breaker according to another embodiment of the present invention.
Figure 17:
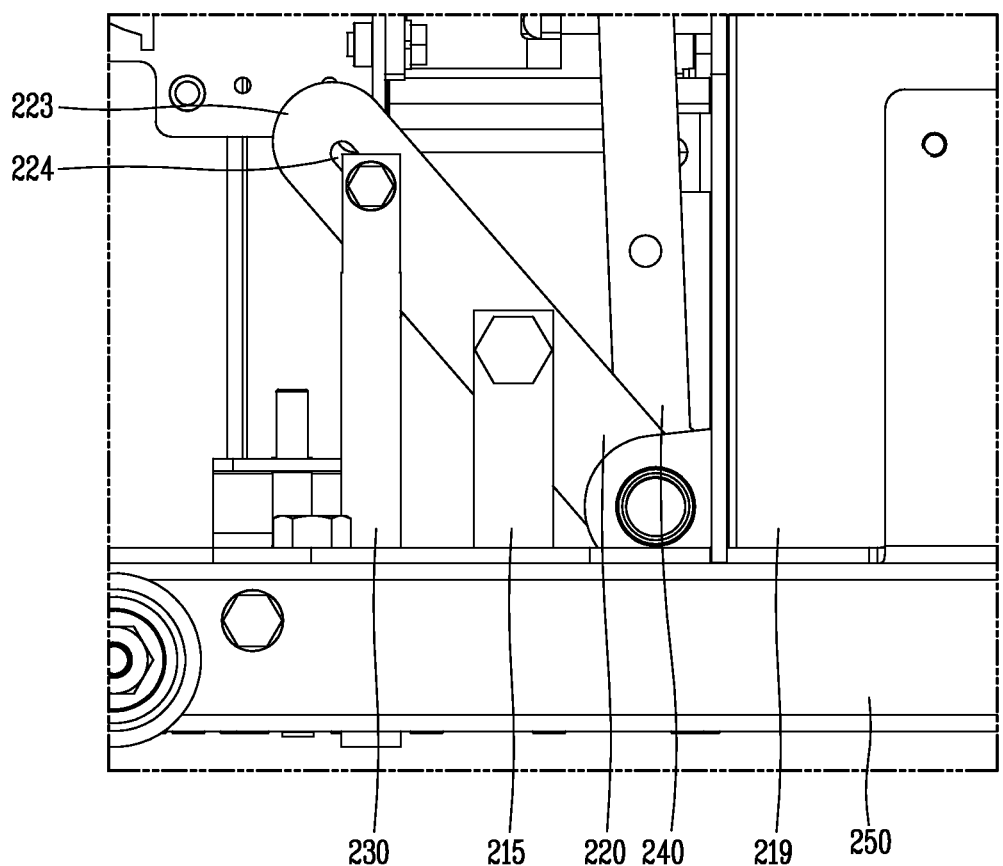
FIG. 17 is a partial detailed view of FIG. 16.
Figure 18:
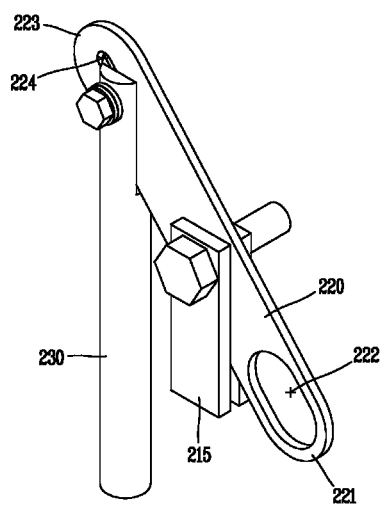
FIG. 18 is a perspective view illustrating an interlock device of a circuit breaker according to another embodiment of the present invention.
Figure 19:
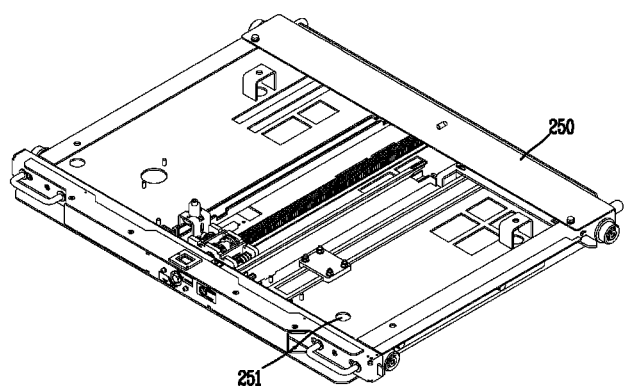
FIG. 19 is a perspective view illustrating a truck assembly of a circuit breaker according to another embodiment of the present invention
Figure 20:
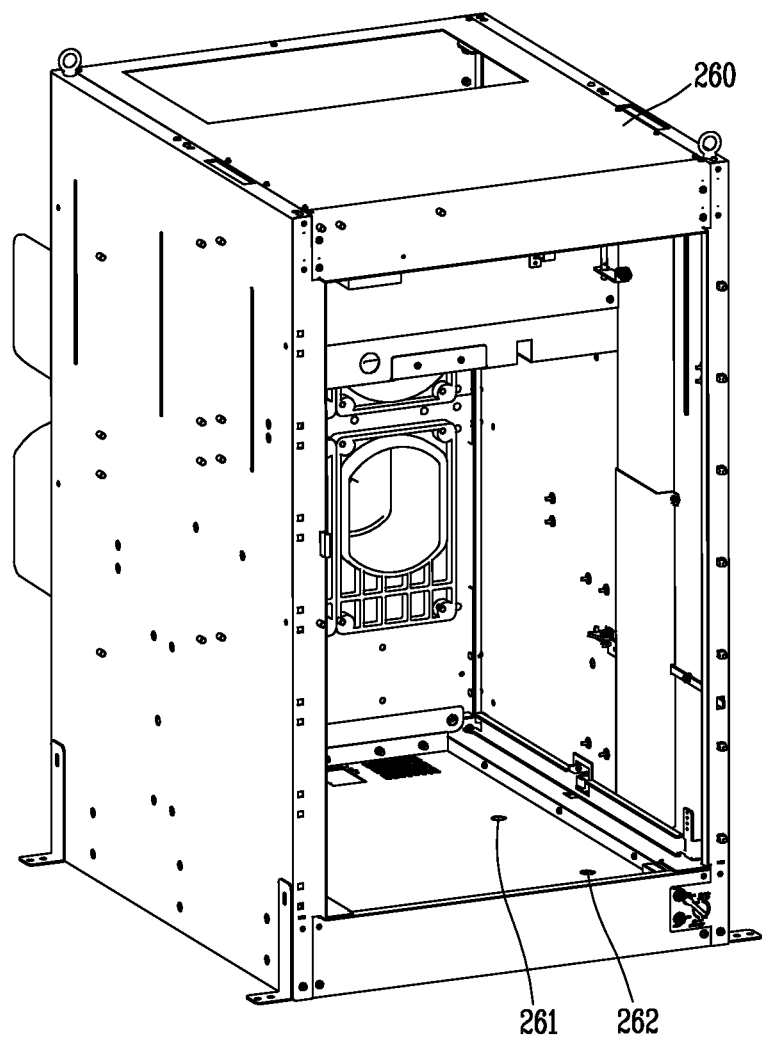
FIG. 20 is a perspective view illustrating a cradle of a circuit breaker according to another embodiment of the present invention.
Figure 21:
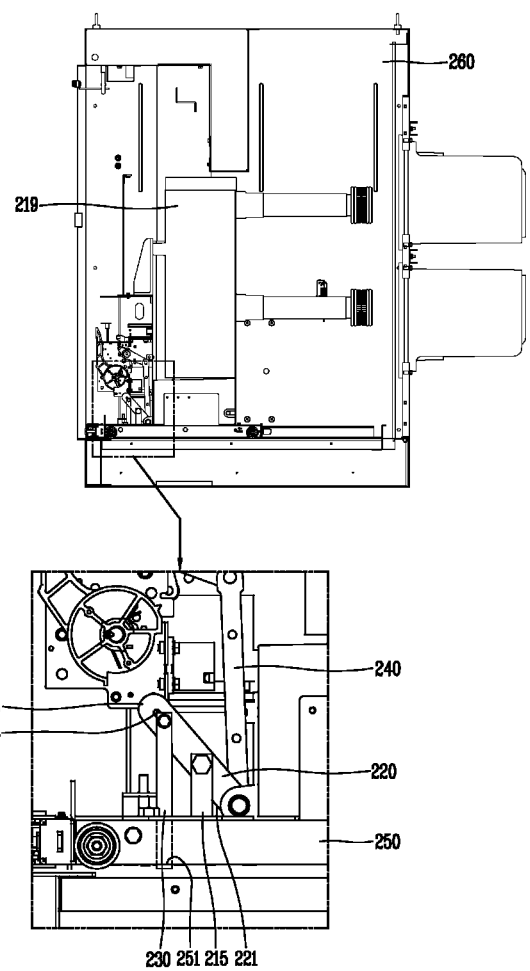
FIG. 21 is a view illustrating an open state of a test position of FIG. 16.
Figure 22:
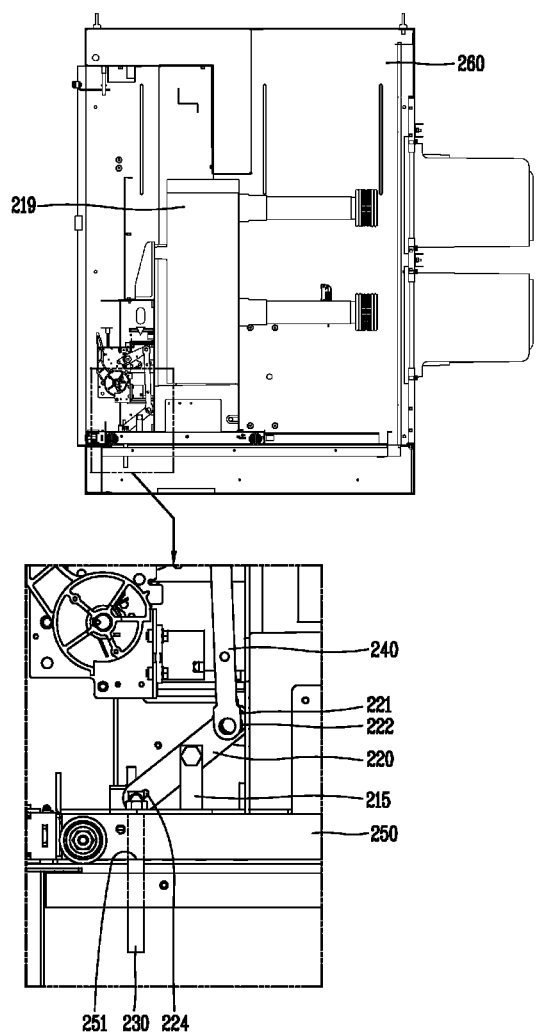
FIG. 22 is a view illustrating a connected state of a test position of FIG. 16.
Figure 23:
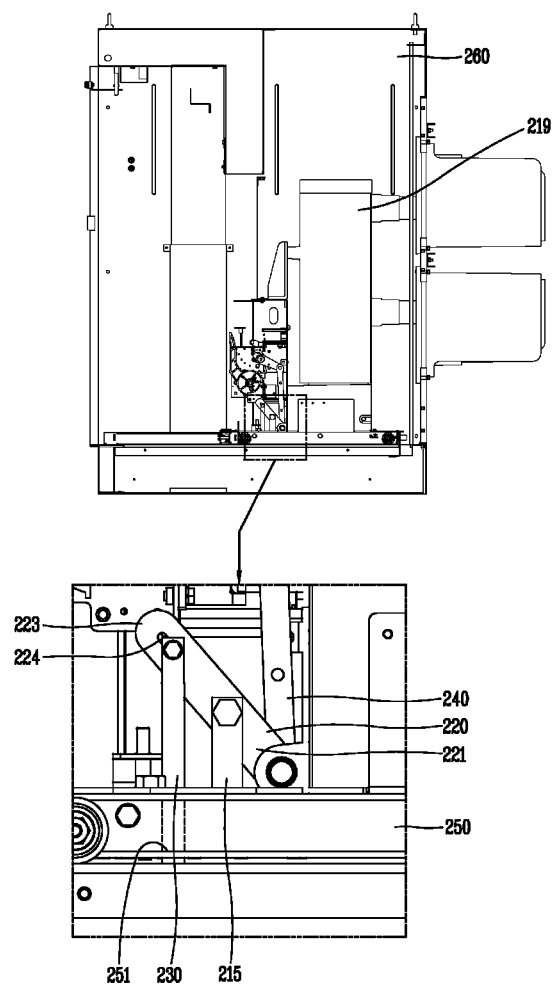
FIG. 23 is a view illustrating an open state of an operation position of FIG. 16.
Figure 24:
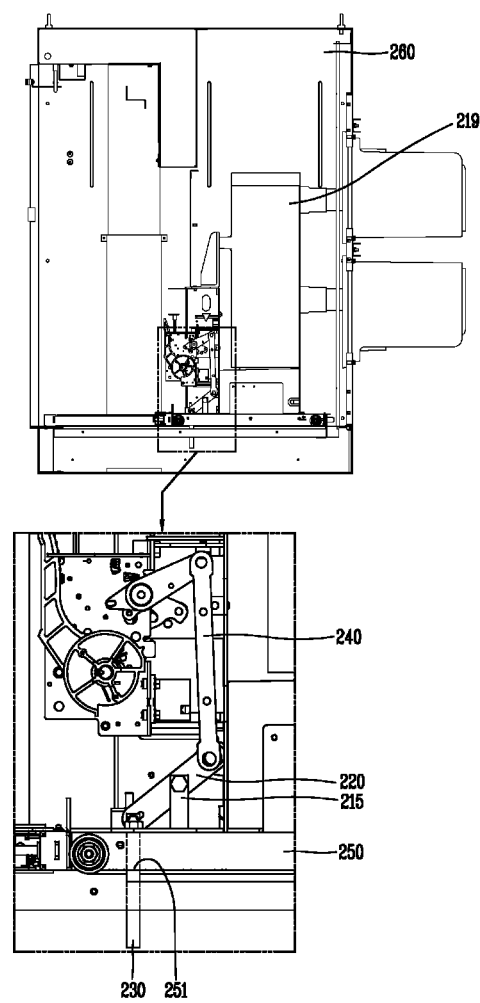
FIG. 24 is a view illustrating a connected state of an operation position of FIG. 16.

As shown in FIG. 16, there is shown a circuit breaker provided with an interlock device according to another embodiment, and FIG. 17 is a partial detailed view of FIG. 16, FIG. 18 is a perspective view illustrating an interlock device of a circuit breaker according to the present invention, FIG. 19 is a perspective view illustrating a truck assembly of a circuit breaker according to another embodiment of the present invention, and FIG. 20 is a perspective view illustrating a cradle of a circuit breaker according to another embodiment of the present invention.

Referring to the drawings, a circuit breaker provided with an interlock device according to another embodiment will be described.

The interlock device of the circuit breaker according to another embodiment includes a support part 215 disposed at part of a lower surface of a main body, an interlock lever 220 rotatably disposed at the support part 215 and having one end 221 connected to a mechanical driving link 240, and an interlock pin 230 connected to another end 226 of the interlock lever 220 and movable up and down. When the circuit breaker is in a connected state, the interlock pin 230 is moved downwardly to thus be inserted into interlock pin holes 261 and 262 of a cradle 260, thereby preventing the main body from being inserted into or withdrawn from the cradle.

The support part 215 is disposed at part of a lower surface of the main body 219. The support part 215 may be disposed at a peripheral portion of the mechanical part driving link 240. The support part 215 may be configured as a pair of plates as shown in FIG. 17. The support part 215 may be coupled to a lower surface of the main body 219 by a screw or welding.

The interlock lever 220 is rotatably disposed at the support part 215. The interlock lever 220 may be formed to have a plate shape. One end 221 of the interlock lever 220 is connected to the mechanical driving link 240 so as to be interlocked therewith. For this, a coupling hole 222, through which a lower end shaft of the mechanical driving link 240 is inserted, may be formed at the one end 221 of the interlock lever 220. Under such a configuration, the one end 221 of the interlock lever 220 is moved along movement of the mechanical part driving link 240.

A pin hole 230, to which the interlock pin 230 is coupled, is provided at another end 223 of the interlock lever 220. The pin hole 230 is formed as a slit so that the interlock pin 230 may be slidably movable therein.

The interlock pin 230 may be formed to have a long rod shape. The interlock pin 230 is configured to restrict movement of the main body by being caught by the truck assembly 250 and the cradle 260.

The truck assembly 250 includes a truck part pin hole 251 through which the interlock pin 230 passes. The truck part pin hole 250 is located at a lower portion of the interlock pin 230 in a mounted state of the main body.

The cradle 260 includes a first interlock pin hole 261 and a second interlock pin hole 262. The first interlock pin hole 261 is formed at the same position as the position where the truck part pin hole 251 is formed when the main body 219 is in an operation position. The second interlock pin hole 261 is formed at the same position as the truck part pin hole when the main body 219 is in a test position.

Hereinafter, an operation of the circuit breaker including the interlock device according to another embodiment of the present invention will be described.

As shown in FIGS. 21 through 24, the support part 215 is disposed on a bottom surface of the main body 219, and the interlock lever 220 is coupled with the mechanical driving link 240 through the coupling hole 222 formed at its one end 221. When a connection operation is performed in a state that the main body 219 is in an operation position, the mechanical driving link 240 moves upwardly and thereby the one end 221 of the interlock lever 220 is moved upwardly and the other end 223 of the interlock lever 220 is moved downwardly.

By such operation, the interlock pin 230, which is coupled to the other end 223 of the interlock lever 220, passes through the truck part pin hole 251 of the truck assembly 250 and the first interlock pin hole 261 of the cradle 260 to thus protrude to a lower portion of the cradle 260. In this case, the interlock pin 230 is caught by the truck assembly 250 and the cradle 260 so that the main body 219 can be restricted from moving.

Here, as an upper portion of the interlock pin 230 is slidably inserted into the pin hole 224 of the interlock lever 220, the interlock pin 230 can be vertically moved without being swayed.

In a disconnected position, as the mechanical driving link 240 descends, one end 221 of the interlock lever 220 is moved downwardly and the other end 223 of the interlock lever 220 is moved upwardly. By such operation, the interlock pin 230, which is coupled to the other end 223 of the interlock lever 220, becomes separated from the truck part pin hole 251 of the truck assembly 250 and the first interlock pin hole 261 of the cradle 260 so that the main body 219 can be freely moved.

In a case where the main body 219 is in a test position, the driving thereof is the same as that in the operation position except that the interlock pin 230 is inserted into the truck part pin hole 251 of the truck assembly 250 and the second interlock pin hole 262 of the cradle 260.

In the above embodiment, the description has been given to a vacuum circuit breaker as an example, but will be understood that it may not be limited thereto.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A withdrawable-type circuit breaker, comprising:
   a cradle;
   a main body connecting a main circuit when inserted into the cradle by a transfer device or disconnecting a connected state of the main circuit when withdrawn from the cradle; and
   an interlock device restricting withdrawal of the main body when the circuit breaker is in a connected state, the interlock device including:
      a support part vertically disposed on a bottom surface of the main body;
      an interlock lever having a sliding hole at one end and a power transmission part at another end, a middle portion of the interlock lever hinge-coupled to one end of the support part and two ends the interlock lever are rotatable; and
      an interlock pin movable up and down, the interlock pin having one end portion inserted into and slidably coupled to the sliding hole and another end portion insertably coupled to an interlock pin hole formed on a bottom surface of the cradle,
   wherein the support part includes:
   a pair of support plates each having one end connected to an intermediate portion of the interlock lever by a hinge shaft and another end coupled to a bottom surface of the main body, the pair of support plates spaced from each other; and
   a connection member installed between the pair of support plates, the connection member connecting the pair of the support plates to each other.

2. The withdrawable-type circuit breaker of claim 1, wherein the main body includes:
   a main body frame;
   a connection spring disposed within the main body frame and performing a connection operation using an elastic force generated when the connection spring is released from a compressed state; and
   a drive crank assembly rotatably disposed within the main body frame and connected to the connection spring via a connection rod provided at one end of the drive crank assembly and a spring support part provided at one end of the connection rod, the drive crank assembly transmitting a rotation force to the connection spring via the connection rod and the spring support part in order to compress and release the connection spring and contacting and transmitting power to the power transmission part via the one end of the drive crank assembly in order to rotate the interlock lever.

3. The withdrawable-type circuit breaker of claim 2, further comprising an elastic member disposed between the interlock lever and the support part, the elastic member connecting the power transmission part to the drive crank assembly by an elastic force of the elastic member.

4. The withdrawable-type circuit breaker of claim 2, wherein the interlock pin restricts movement of the main body when inserted into the interlock pin hole when the connection spring is compressed.

5. The withdrawable-type circuit breaker of claim 3, wherein the elastic member is a coil spring having one end coupled to the one end of the interlock lever and another end coupled to the support part, the elastic member elastically supporting the power transmission part such that the power transmission part is in contact with the one end of the drive crank assembly.

6. The withdrawable-type circuit breaker of claim 3, wherein the elastic member is a twisted spring having one end fixed to one end of the support part and another end fixed to the middle portion of the interlock lever, the elastic member elastically supporting the power transmission part such that the power transmission part is in contact with the one end of the drive crank assembly.

7. The withdrawable-type circuit breaker of claim 1, wherein the transfer device includes a through-hole through which the interlock pin passes and a transfer car supporting the main body.

8. The withdrawable-type circuit breaker of claim 1, wherein the support part includes a stopper disposed within a rotation radius of the interlock lever, the stopper restricting a rotation angle of the interlock lever.

9. The withdrawable-type circuit breaker of claim 1, wherein the interlock pin hole includes:
   a first interlock pin hole in which the interlock pin is inserted when the main body is inserted into a connected position; and
   a second interlock pin hole in which the interlock pin is inserted when the main body is withdrawn to a test position.

10. The withdrawable-type circuit breaker of claim 1, wherein:
   the interlock lever is formed of a rod shape; and
   the sliding hole is formed as a slit at the another end of the interlock lever in a lengthwise direction.

11. A withdrawable-type circuit breaker, comprising:
   a cradle;
   a main body connecting a main circuit when inserted into the cradle by a transfer device or disconnecting a connected state of the main circuit when withdrawn from the cradle; and
   an interlock device restricting withdrawal of the main body when the circuit breaker is in a connected state, the interlock device including:
      a support part vertically disposed on a bottom surface of the main body;
      an interlock lever having a sliding hole at one end and a power transmission part at another end, a middle portion of the interlock lever hinge-coupled to one end of the support part and two ends the interlock lever are rotatable; and an interlock in movable up and down, the interlock in having one end portion inserted into and slidably coupled to the sliding hole and another end portion insertably coupled to an interlock in hole formed on a bottom surface of the cradle, wherein the interlock lever is:

connected to a mechanical part driving link provided within interior of the main body by a shaft via a coupling hole provided at the power transmission part; and receives power from the power transmission part when the mechanical part driving link moves upward when the circuit breaker is in a connected position and to insert the interlock pin into the interlock pin hole.

12. The withdrawable-type circuit breaker of claim 11, wherein the coupling hole is formed as a slit such that a shaft of the mechanical part driving link is slidably inserted and coupled to the coupling hole.

* * * * *